US 11,295,748 B2

(12) United States Patent
Shen et al.

(10) Patent No.: US 11,295,748 B2
(45) Date of Patent: Apr. 5, 2022

(54) SPEAKER IDENTIFICATION WITH ULTRA-SHORT SPEECH SEGMENTS FOR FAR AND NEAR FIELD VOICE ASSISTANCE APPLICATIONS

(71) Applicant: Robert Bosch GmbH, Stuttgart (DE)

(72) Inventors: Zhongnan Shen, Milpitas, CA (US); Fuliang Weng, Mountain View, CA (US); Gengyan Bei, San Jose, CA (US); Pongtep Angkititrakul, Dublin, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/629,945

(22) PCT Filed: Dec. 14, 2018

(86) PCT No.: PCT/EP2018/085042
§ 371 (c)(1),
(2) Date: Jan. 9, 2020

(87) PCT Pub. No.: WO2019/129511
PCT Pub. Date: Jul. 4, 2019

(65) Prior Publication Data
US 2020/0152206 A1    May 14, 2020

Related U.S. Application Data

(60) Provisional application No. 62/610,337, filed on Dec. 26, 2017.

(51) Int. Cl.
*G10L 17/06* (2013.01)
*G10L 17/02* (2013.01)
(Continued)

(52) U.S. Cl.
CPC .............. *G10L 17/06* (2013.01); *G10L 17/00* (2013.01); *G10L 17/02* (2013.01); *G10L 25/24* (2013.01)

(58) Field of Classification Search
None
See application file for complete search history.

(56) References Cited

U.S. PATENT DOCUMENTS 5,774,858 A * 6/1998 Taubkin ................ B60R 25/257
704/270
9,711,148 B1 * 7/2017 Sharifi ..................... G10L 17/24
(Continued)

FOREIGN PATENT DOCUMENTS

EP        2 897 076 A1    7/2015

OTHER PUBLICATIONS

International Search Report corresponding to PCT Application No. PCT/EP2018/085042, dated Apr. 8, 2019 (4 pages).

*Primary Examiner* — Douglas Godbold
(74) *Attorney, Agent, or Firm* — Maginot, Moore & Beck LLP

(57) ABSTRACT

A speaker recognition device includes a memory, and a processor. The memory stores enrolled key phrase data corresponding to utterances of a key phrase by enrolled users, and text-dependent and text-independent acoustic speaker models of the enrolled users. The processor is operatively connected to the memory, and executes instructions to authenticate a speaker as an enrolled user, which includes detecting input key phrase data corresponding to a key phrase uttered by the speaker, computing text-dependent and text-independent scores for the speaker using speech models of the enrolled user, computing a confidence score, and authenticating or rejecting the speaker as the enrolled user based on whether the confidence score indicates that the
(Continued)

input key phrase data corresponds to the speech from the enrolled user.

13 Claims, 9 Drawing Sheets

(51) Int. Cl.
*G10L 25/24* (2013.01)
*G10L 17/00* (2013.01)

(56) References Cited

U.S. PATENT DOCUMENTS

| | | | |
|---|---|---|---|
| 9,990,926 B1* | 6/2018 | Pearce | G10L 15/05 |
| 2003/0216916 A1* | 11/2003 | Navratil | G10L 17/06 |
| | | | 704/250 |
| 2007/0198257 A1* | 8/2007 | Zhang | G10L 17/20 |
| | | | 704/233 |
| 2010/0268537 A1* | 10/2010 | Al-Telmissani | G10L 17/04 |
| | | | 704/246 |
| 2013/0325473 A1* | 12/2013 | Larcher | G10L 17/10 |
| | | | 704/249 |
| 2014/0278443 A1* | 9/2014 | Gunn | G06F 1/3265 |
| | | | 704/275 |
| 2015/0302856 A1 | 10/2015 | Kim et al. | |
| 2016/0225374 A1* | 8/2016 | Rodriguez | G10L 17/10 |
| 2016/0248768 A1* | 8/2016 | McLaren | H04L 63/0861 |
| 2017/0053667 A1* | 2/2017 | Wolff | G10L 21/0232 |
| 2018/0232201 A1* | 8/2018 | Holtmann | G06F 21/32 |
| 2018/0366124 A1* | 12/2018 | Cilingir | G10L 25/60 |
| 2019/0080698 A1* | 3/2019 | Miller | G10L 17/22 |
| 2020/0175993 A1* | 6/2020 | Cho | G06F 21/32 |

\* cited by examiner

SPEAKER IDENTIFICATION WITH ULTRA-SHORT SPEECH SEGMENTS FOR FAR AND NEAR FIELD VOICE ASSISTANCE APPLICATIONS

RELATED APPLICATIONS

This application is a 35 U.S.C. § 371 National Stage Application of PCT/EP2018/085042, filed on Dec. 14, 2018, which claims the benefit of priority of U.S. Provisional Application No. 62/610,337, filed on Dec. 26, 2017, the disclosures of which are incorporated herein by reference in their entirety.

TECHNICAL FIELD

This disclosure relates generally to speaker recognition, and, more particularly, to speaker recognition using ultra-short speech segments.

BACKGROUND

Conversational dialogue systems have gained increasing acceptance in a wide range of applications, including home, mobile, and other scenarios. Identifying a person by using such a system during the course of a conversation can facilitate a personalized user experience while retaining control over different levels of access to the system.

"Speaker recognition" is the identification of a speaking person, i.e. a "speaker," based on their voice. Typical speaker recognition systems generally require a multitude of voice samples from an enrolled speaker in order to extract sufficient statistics representing the speaker's unique voice characteristics. These speaker-specific characteristics of acoustic signals are stored as a speaker's acoustic model or voiceprint. When a person speaks, speaker recognition system will generally compare the person's voice features with enrolled speaker models and a background model representing general human voices, and then decide whether or not to authenticate the person as an enrolled user based on the comparison.

Conventional systems have some disadvantages when authentication is to be performed with only a limited amount of voice samples available. A speech recognition system that is optimized for speaker identification and authorization when a limited amount of voice samples are available would be beneficial.

SUMMARY

In order to decrease the length and number of speech samples required when enrolling users, this disclosure proposes a system that combines text-dependent and text-independent models of human speech when authenticating a speaker as an enrolled user with a speaker recognition system.

An exemplary method of authenticating a speaker as an enrolled user includes detecting, with a processor, input key phrase data corresponding to a key phrase uttered by a speaker. The processor computes a text-dependent score with reference to the input key phrase data and a text-dependent acoustic speaker model of speech from the enrolled user stored in a memory operatively connected to the processor. The processor further computes a text-independent score with reference to the input key phrase data and to a text-independent acoustic speaker model of the speech from the enrolled user stored in the memory. The processor additionally computes a confidence score for authenticating the speaker as the enrolled user with reference to the text-dependent score and the text-independent score. The processor authenticates the speaker as the enrolled user when the confidence score indicates that the input key phrase data corresponds to the speech from the enrolled user, and rejects the authentication of the speaker as the enrolled user when the confidence score indicates that the input key phrase data does not correspond to the speech from the enrolled user.

Another exemplary method of authenticating a speaker as an enrolled user includes detecting, with a processor, that audio data includes key phrase data corresponding to an utterance of a key phrase by the speaker. In some embodiments, the processor computes a text-dependent score with reference to the key phrase data and to a text-dependent acoustic speaker model of the enrolled user stored in a memory operatively connected to the processor. The processor also computes a text-independent score with reference to the key phrase data and to a text-independent acoustic speaker model of the enrolled user stored in the memory. The processor further computes a confidence score for authenticating the speaker as the enrolled user with reference to the text-dependent score and the text-independent score. The processor authenticates the speaker as the enrolled user when the confidence score indicates that the key phrase was uttered by the enrolled user, and rejects the authentication of the speaker as the enrolled user when the confidence score indicates that the key phrase was not uttered by the enrolled user.

Another exemplary method of authenticating a speaker as an enrolled user includes receiving an audio signal with an input device, and storing the audio signal as audio data in a memory. A processor operatively connected to the memory detects that the audio data includes key phrase data corresponding to an utterance of a key phrase by a speaker. The processor computes a text-dependent score with reference to the key phrase data and to a text-dependent acoustic speaker model of an enrolled user stored in the memory, and computes a text-independent score with reference to the key phrase data and to a text-independent acoustic speaker model of the enrolled user stored in the memory The processor further computes a confidence score for authenticating the speaker as the enrolled user with reference to the text-dependent score and the text-independent score. The processor compares the confidence score with a predetermined confidence threshold stored in the memory, and in response to the comparison, selects between authenticating the speaker as the enrolled user when the confidence score is at or above the predetermined threshold, and rejecting authentication of the speaker as the enrolled user when the confidence score is below the predetermined threshold.

In some embodiments, the processor outputs, using an output device operatively connected to the processor, a response to the speaker indicative of whether the speaker was authenticated or rejected.

In some embodiments, prior to detecting the key phrase data, the processor operates in a standby operating state. In response to detecting the key phrase data, the processor transitions to operating in an active operating state.

In some embodiments, the text-dependent model is a Hidden Markov Model ("HMM") formed using groups of mel-frequency cepstral coefficients ("MFCC"s) extracted from utterances of the key phrase by the enrolled user. Each group corresponds to a partial portion of the key phrase.

In some embodiments, detecting the key phrase data in the input audio data includes separating a portion of the audio data into predetermined segments. The processor extracts MFCCs indicative of human speech features present within each segment. In some embodiments, computing the text-dependent score includes generating MFCCs corresponding to the key phrase using the HMM, and applying a Viterbi algorithm to the MFCCs extracted from the portion of the audio signal and the MFCCs generated with the HMM.

In some embodiments, detecting the input key phrase data in the input audio data includes separating a portion of the audio data into predetermined segments. The processor extracts MFCCs indicative of human speech features present within each segment, and compares the extracted MFCCs with MFCCs corresponding to the key phrase from a Universal Background Model ("UBM") stored in the memory. The processor further determines that the portion of the audio signal includes the utterance of the key phrase based on the comparison.

In some embodiments, computing the text-dependent score includes generating MFCCs corresponding to the key phrase using the text-dependent model. The processor computes a raw text-dependent score based on the extracted MFCCs and the MFCCS generated with the text-dependent model, and subtracts a speaker-specific threshold bias for the text-dependent model from the raw text-dependent score. The speaker-specific threshold bias for the text-dependent model is based on a comparison the MFCCS generated with the text-dependent model and MFCCs corresponding to the key phrase from a UBM matched to a gender of the enrolled user.

In some embodiments, computing the text-independent score includes generating MFCCs corresponding to the key phrase using the text-independent model. The processor computes a raw text-dependent score based on the extracted MFCCs and the MFCCS generated with the text-independent model, and subtracts a speaker-specific threshold bias for the text-independent model from the raw text-independent score. The speaker-specific threshold bias for the text-independent model is based on a comparison the MFCCS generated with the text-independent model and MFCCs corresponding to the key phrase from a UBM matched to a gender of the enrolled user.

In some embodiments, the method further includes comparing, with the processor, the detected input key phrase data with enrolled key phrase data corresponding to a plurality of enrolled users stored in the memory. The processor computes a likelihood score for each enrolled user. Each likelihood score is indicative of an amount of similarity between the detected input key phrase data and the corresponding enrolled key phrase data for each enrolled user. The processor selects the enrolled user having enrolled key phrase data with a highest amount of similarity with the detected key phrase data as a possible identification of the speaker.

In some embodiments, the processor applies far-field enhancement to one or more of the input audio data and the input key phrase data.

In some embodiments, the confidence score is computed as a linear combination of the text-dependent score and the text-independent score.

In some embodiments, the method further includes enrolling a user.

In some embodiments, enrolling a user includes extracting further input key phrase data from to a speech sample provided by the user. The further input key phrase data corresponding to the key phrase uttered by the user in the speech sample. The processor determines whether the extracted further input key phrase data satisfies a set of predetermined quality assessment criteria. The processor further determines whether a sufficient number of speech samples for the user have been received based on whether a predetermined minimum quantity of further input key phrase data satisfying the predetermined quality assessment criteria have been received, and whether a total duration of speech in the key phrase data satisfying the predetermined quality assessment criteria is at or above a predetermined period of time. In response to determining that a sufficient number of speech samples has not been received, the processor generates a prompt for the user to provide an additional speech sample, and outputs the prompt via the output device. In response to determining that a sufficient number of speech samples has been received, the processor forms an acoustic speaker model for the user that includes a text-dependent acoustic speaker model and a text-independent acoustic speaker model so as to enroll the user.

In some embodiments, enrolling a user includes receiving, with the processor and an input device operatively connected to the processor, a speech sample from the user that includes the key phrase, and storing the speech sample in the memory as further audio data. The processor extracts key phrase data from the further audio data corresponding to the key phrase from the speech sample. The processor determines whether the extracted key phrase data satisfies a set of predetermined quality assessment criteria, and determines whether a sufficient number of speech samples for the user have been received based on whether a predetermined minimum quantity of key phrase data satisfying the predetermined quality assessment criteria have been received, and whether a total duration of speech in the key phrase data satisfying the predetermined quality assessment criteria is at or above a predetermined period of time. In response to determining that a sufficient number of speech samples has not been received, the processor generates a prompt for the user to provide an additional speech sample, and outputs the prompt via an output device operatively connected to the processor. In response to determining that a sufficient number of speech samples has been received, the processor forms an acoustic speaker model for the user that includes a text-dependent model and a text-independent model so as to enroll the user.

In some embodiments, enrolling the user includes extracting, with the processor, key phrase data from further audio data that includes an utterance of the key phrase by the user. The processer determines whether the extracted key phrase data satisfies a set of predetermined quality assessment criteria. The processor further determines whether a sufficient number of speech samples for the user have been received based on whether a predetermined minimum quantity of key phrase data satisfying the predetermined quality assessment criteria have been received, and whether a total duration of speech in the key phrase data satisfying the predetermined quality assessment criteria is at or above a predetermined period of time. In response to determining that a sufficient number of speech samples has not been received, the processor generates a prompt for the user to provide an additional speech sample, and outputting the prompt via an output device operatively connected to the processor. In response to determining that a sufficient number of speech samples has been received, the processor forms an acoustic speaker model for the user that includes a text-dependent acoustic speaker model and a text-independent acoustic speaker model so as to enroll the user.

In some embodiments, generating the prompt includes identifying one or more of the predetermined quality assessment criteria that were not satisfied by further input key phrase data extracted from a preceding speech sample. The processor determines a modification to the preceding speech sample that would overcome the unmet one or more of the predetermined quality assessment criteria, and include an instruction indicative of the determined modification in the prompt.

In some embodiments, forming an acoustic speaker model for the user includes training the text-dependent model and training the text independent model. Training the text-dependent model includes extracting MFCCs from the further input key phrase data extracted from each speech sample provided by the user, and separating the MFCCs from each speech sample into groups, each group corresponding to a partial portion of the key phrase. For each group of the MFCCs for each speech sample, the processor uses the segment to adapt a Universal Background Model ("UBM") and form a respective Gaussian Mixture Model ("GMM"), and trains a Hidden Markov Model, with the GMMs for the groups as initialized states, to form the text-dependent model. Training the text-independent model includes identifying, with the processor, portions of the input audio data corresponding to portions of the speech samples provided by the user that include human speech, and extracting MFCCs from the identified portions of the audio data. The processor uses the MFCCs extracted from the identified portions of the audio data to adapt a UBM and form the text-independent model.

A speaker recognition device includes an input device configured to receive an audio signal, an output device, a memory, and a processor operatively connected to the input device, the output device, and the memory. The memory is configured to store audio data corresponding to the audio signal, enrolled key phrase data corresponding to utterances of a key phrase by enrolled users, text-dependent acoustic speaker models of the enrolled users, text-independent acoustic speaker models of the enrolled users, and a predetermined confidence threshold. The processor is configured to execute programming instructions to authenticate a speaker as one of the enrolled users.

In some embodiments, authenticating the speaker as an enrolled user includes detecting, with a processor, input key phrase data corresponding to a key phrase uttered by a speaker. The processor computes a text-dependent score with reference to the input key phrase data and a text-dependent acoustic speaker model of speech from the enrolled user stored in a memory operatively connected to the processor. The processor further computes a text-independent score with reference to the input key phrase data and to a text-independent acoustic speaker model of the speech from the enrolled user stored in the memory. The processor additionally computes a confidence score for authenticating the speaker as the enrolled user with reference to the text-dependent score and the text-independent score. The processor authenticates the speaker as the enrolled user when the confidence score indicates that the input key phrase data corresponds to the speech from the enrolled user, and rejects the authentication of the speaker as the enrolled user when the confidence score indicates that the input key phrase data does not correspond to the speech from the enrolled user.

In some embodiments, authenticating the speaker as one of the enrolled users includes receiving an audio signal with an input device, and storing the audio signal as audio data in a memory. The processor detects that the audio data includes key phrase data corresponding to an utterance of a key phrase by a speaker. The processor computes a text-dependent score with reference to the key phrase data and to a text-dependent acoustic speaker model of an enrolled user, and computes a text-independent score with reference to the key phrase data and to a text-independent acoustic speaker model of the enrolled user. The processor further computes a confidence score for authenticating the speaker as the enrolled user with reference to the text-dependent score and the text-independent score. The processor compares the confidence score with the predetermined confidence threshold, and in response to the comparison, selects between authenticating the speaker as the enrolled user when the confidence score is at or above the predetermined threshold, and rejecting authentication of the speaker as the enrolled user when the confidence score is below the predetermined threshold.

In some embodiments, authenticating the speaker includes detecting, with a processor, that audio data includes key phrase data corresponding to an utterance of a key phrase by the speaker. In some embodiments, the processor computes a text-dependent score with reference to the key phrase data and to a text-dependent acoustic speaker model of the enrolled user stored in a memory operatively connected to the processor. The processor also computes a text-independent score with reference to the key phrase data and to a text-independent acoustic speaker model of the enrolled user stored in the memory. The processor further computes a confidence score for authenticating the speaker as the enrolled user with reference to the text-dependent score and the text-independent score. The processor authenticates the speaker as the enrolled user when the confidence score indicates that the key phrase was uttered by the enrolled user, and rejects the authentication of the speaker as the enrolled user when the confidence score indicates that the key phrase was not uttered by the enrolled user.

In some embodiments, the processor is further configured to execute programming instructions to enroll a user.

In some embodiments, enrolling a user includes receiving, with the processor and an input device operatively connected to the processor, a speech sample from the user that includes the key phrase, and storing the speech sample in the memory as further audio data. The processor extracts key phrase data from the further audio data corresponding to the key phrase from the speech sample. The processor determines whether the extracted key phrase data satisfies a set of predetermined quality assessment criteria, and determines whether a sufficient number of speech samples for the user have been received based on whether a predetermined minimum quantity of key phrase data satisfying the predetermined quality assessment criteria have been received, and whether a total duration of speech in the key phrase data satisfying the predetermined quality assessment criteria is at or above a predetermined period of time. In response to determining that a sufficient number of speech samples has not been received, the processor generates a prompt for the user to provide an additional speech sample, and outputs the prompt via an output device operatively connected to the processor. In response to determining that a sufficient number of speech samples has been received, the processor forms an acoustic speaker model for the user that includes a text-dependent model and a text-independent model so as to enroll the user.

In some embodiments, enrolling the user includes extracting, with the processor, key phrase data from further audio data that includes an utterance of the key phrase by the user. The processer determines whether the extracted key phrase data satisfies a set of predetermined quality assessment criteria. The processor further determines whether a sufficient number of speech samples for the user have been received based on whether a predetermined minimum quantity of key phrase data satisfying the predetermined quality assessment criteria have been received, and whether a total duration of speech in the key phrase data satisfying the predetermined quality assessment criteria is at or above a predetermined period of time. In response to determining that a sufficient number of speech samples has not been received, the processor generates a prompt for the user to provide an additional speech sample, and outputting the prompt via an output device operatively connected to the processor. In response to determining that a sufficient number of speech samples has been received, the processor forms an acoustic speaker model for the user that includes a text-dependent acoustic speaker model and a text-independent acoustic speaker model so as to enroll the user.

In some embodiments, the processor is further configured to apply far-field enhancement to one or more of the input audio data, the input key phrase data, and the further input key phrase data.

BRIEF DESCRIPTION OF THE DRAWINGS

The foregoing aspects and other features of the present disclosure are explained in the following description, taken in connection with the accompanying drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

This disclosure is directed toward speaker identification technologies that utilize ultra-short speech segments, as well as technologies that are optimized for both near and far field conversational assistance applications. Such technologies minimize an amount of data needed for user enrollment, and are capable of making an acceptance/rejection decision based on a very short amount of claimant speech.

Figure 1:
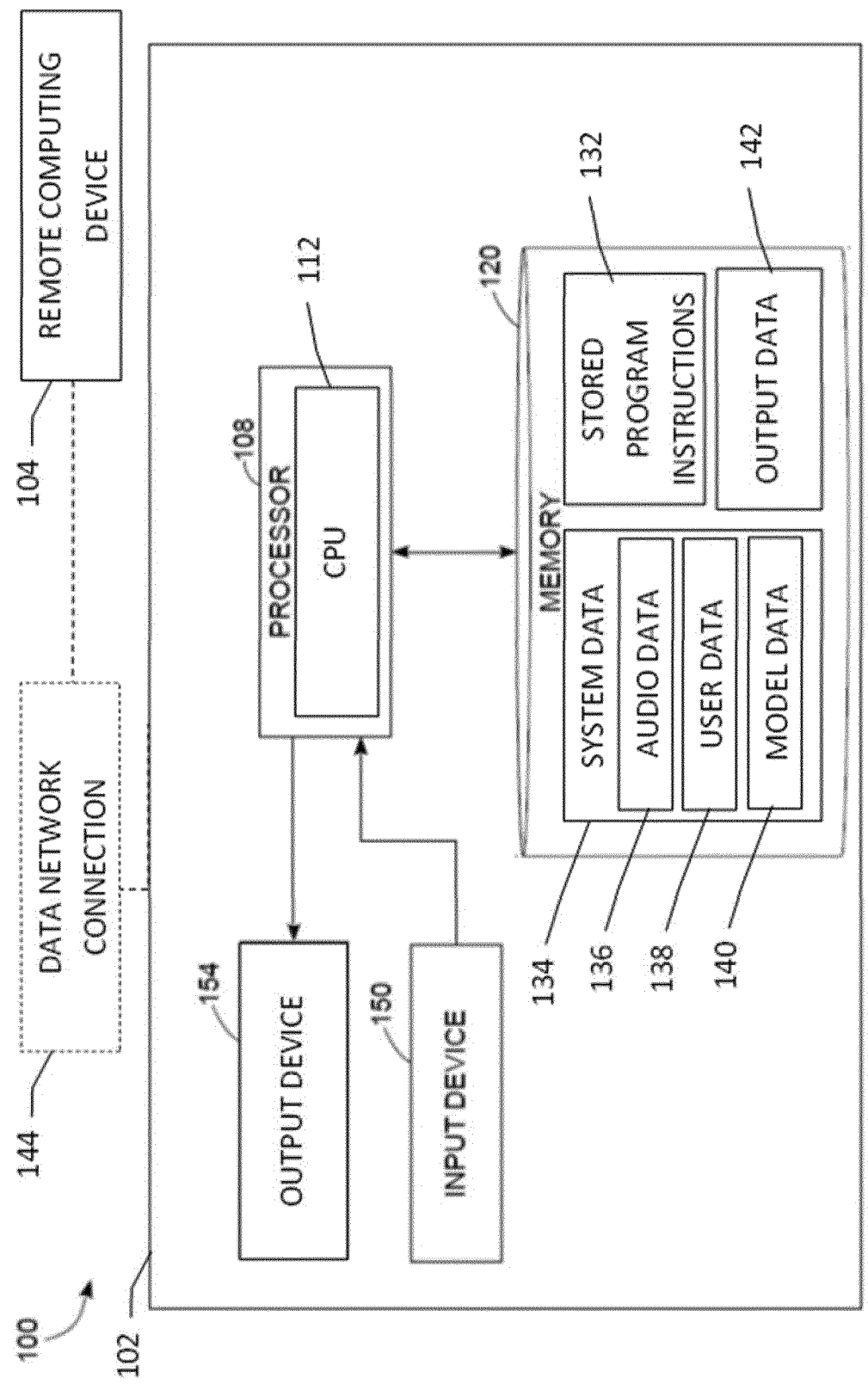
FIG. 1 is a schematic diagram of an exemplary embodiment of a speech recognition system.

As shown in FIG. 1, the system 100 includes a speaker recognition device 102, and a remote computing device 104. The speaker recognition device 102 includes a processor 108 that is operatively connected to a memory 120, an input device 150, and an output device 154. In some embodiments, the system 100 is configured to enroll a speaker as a user based on the speaker's speech. As described in more detail below, when operating in an enrolment mode, the system 100 enrolls a speaker as a user by forming a speaker acoustic model for a user. In some embodiments, the system 100 is configured to recognize and/or authenticate a speaker as an enrolled user based on the speaker's speech. As described in more detail below, when operating in an authentication mode, the system 100 is configured to identify whether a speaker is an enrolled user, and perform an operation based on the identification, such as grant or deny predefined control and/or access to the system 100. In some embodiments, the system 100 does not include a remote computing device.

In the speaker recognition device 102, the processor 108 includes one or more integrated circuits that implement the functionality of a central processing unit (CPU) 112. During operation, the CPU 112 is configured to execute stored program instructions 132 that are retrieved from the memory 120. The stored program instructions 132 include software that control the operation of the CPU 112 to enroll and/or authenticate a speaker as a user based on the speaker's speech.

In some embodiments, the processor 108 is a system on a chip. In some embodiments, other components including, for example, the memory 120, a network device, and a positioning system, are integrated into a single integrated device. In some embodiments, the CPU 112 and other components are connected to each other via any suitable peripheral data connection. In some embodiments, the CPU 112 is a commercially available central processing device that implements an instruction set such as one of the x86, ARM, Power, or MIPS instruction set families. In some embodiments, processor 108 executes software programs including drivers and other software instructions. In some embodiments, the processor 108 is located in a server, and the remote computing device 104 acts as a client device. Additionally, alternative embodiments of the processor 108 can include microcontrollers, application specific integrated circuits (ASICs), field programmable gate arrays (FPGAs), digital signal processors (DSPs), or any other suitable digital logic devices in addition to or as replacements of the CPU 112.

In the speaker recognition device 102, the memory 120 includes both non-volatile memory and volatile memory devices. The non-volatile memory includes solid-state memory, such as NAND flash memory, magnetic and optical storage media, or any other suitable data storage device that retains data when the system 100 is deactivated or loses electrical power. The volatile memory includes static and dynamic random access memory (RAM) that, during operation of the system 100, is configured to store program instructions 132, output data 142, and system data 134. The memory 120 stores data in any suitable format. As discussed in more detail below, in various embodiments, the system data 134 in the memory 120 includes one or more of audio data 136, user data 138, speech model data 140, and other data (not shown).

The input device 150 includes any device that enables the system 100 to receive the program instructions 132, the system data 134, and the output data 142. Examples include human interface inputs such as a keyboard, mouse, touchscreen, voice input device, camera, sensor, and the like. One non-limiting example of an input device 150 includes one or more microphones or microphone arrays. In some embodiments, the input device 150 includes a near-field microphone or microphone array and a far-field microphone or microphone array. In some embodiments, the input device 150 includes only a near-field microphone or microphone array. Additionally, in some embodiments the input device 150 is a network adapter or peripheral interconnection device that receives data from another computer or external data storage device, such as the remote computing device 104, via a data network connection 144.

The output device 154 includes any device that enables the system 100 to output the output data 142. Examples include a speaker, a visual display device such as an LED or other indicator, a graphical display device such as an electronic display screen, projector, or printer. In some embodiments, the system 100 includes multiple output devices 154, and different portions of the output data 142 are displayed on different output devices 154.

In some embodiments the processor 108 generates the output data 142 as one or more data files, and the processor 108 transmits the output data 142 to the remote computing device 104 via a data network connection 144 such as the internet or any other acceptable data connection. The remote computing device 104 is configured to output the output data 142 as, for example, an audio signal, a visual signal, or the like. In one non-limiting example, the processor 108 is implemented in a server computing device that executes the stored program instructions 132 to implement a web server that transmits the output data 142 to a web browser in the remote computing device 104 via a data network connection 144. The remote computing device 104 is as a client device that implements a web browser or other suitable output software to output the output data 142 received from the server using an output device 154 that is integrated into the remote computing device 104.

Figure 2:
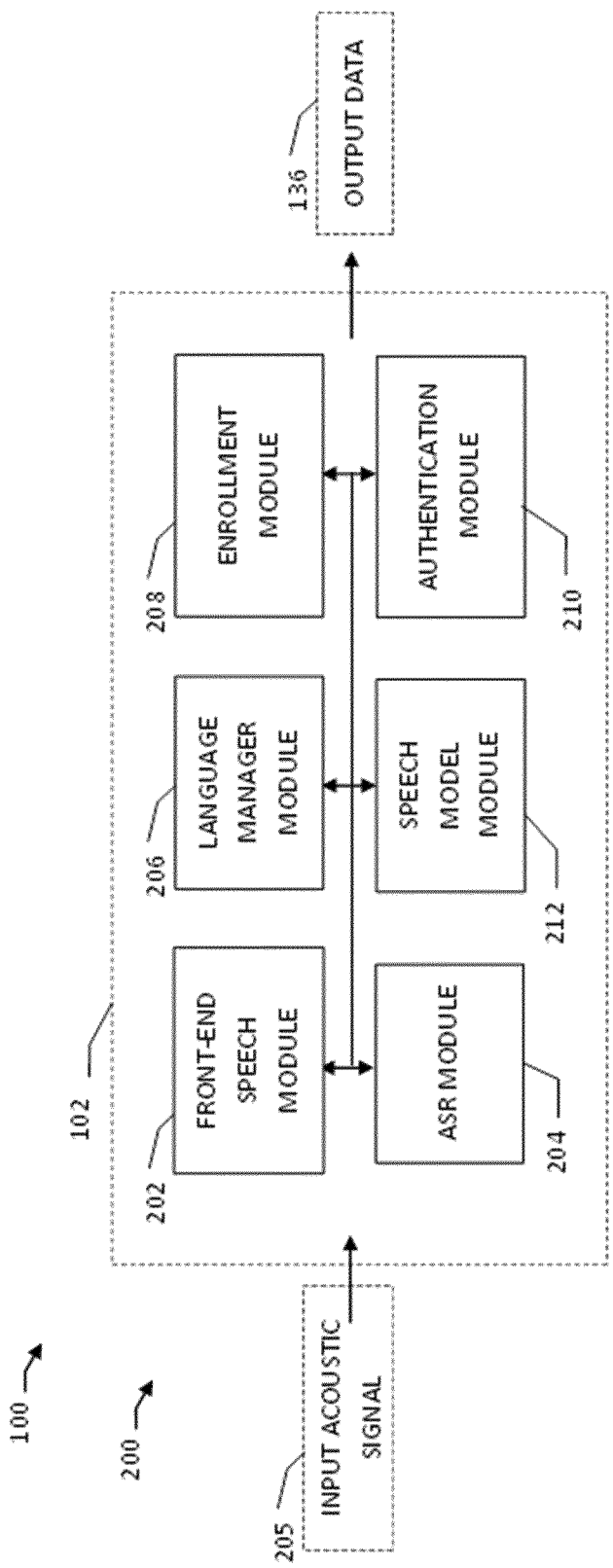
FIG. 2 is a block diagram of functional components for operation of the system of FIG. 1.

In operation of the system 100, the processor 108 executes the stored program instructions 132 in conjunction with the other components of the system 100. FIG. 2 is a block diagram 200 depicting an exemplary embodiment of functional components for operation of the system 100. As used herein a "functional component" is a component or module that includes hardware, or a combination of hardware and software, which is implemented by the processor 108 with reference to the program instructions 132 in order to perform a function or functions. In the description below, actions described as performed by or with functional components are executed by the processor 108 using the elements of the system 100 discussed above. Further, while acts are described in the embodiments below as being performed by a particular functional component, such acts are performed by other components or a combination of various components in other embodiments.

As shown in FIG. 2, the system 100 includes a front-end speech module 202, an automatic speech recognition ("ASR") module 204, a language manager module 206, an enrollment module 208, an authentication module 210, and a speech model module 212. The front-end speech module 204 receives an input acoustic signal 205 using the input device 150, and stores the acoustic signal as audio data 136 in the memory 120. In some embodiments, the front-end speech module 204 applies a filter to the audio data 136 to reduce background noise and/or ambient reverberation in the acoustic signal.

Audio data 136 includes, for example, data corresponding to a speech sample, key phrase data, mel-frequency cepstral coefficients ("MFCC"s), a signal-to-noise ratio ("SNR), and other data describing an acoustic signal. A speech sample is an acoustic signal that includes human speech. Any acceptable file format is usable for storing audio data, such as, for example, uncompressed formats like WAV, AIFF, raw, lossless compression formats such as FLAC, TTA, MPEG-4, and other formats like MP3, and AAC.

A "key phrase" is a predetermined audible phrase of human language. As used herein, the term "key phrase" refers to the actual utterance of the predetermined audible phrase by a speaker within a speech sample or portion of a speech sample. Key phrase data refers to characteristic information and data usable to identify the predetermined audible phrase within a speech sample, such as MFCCs corresponding to the predetermined audible phrase.

An MFCC is a feature vector of coefficients indicative of the human vocal frequencies present in an audio signal during a discrete segment of time. A "segment" for speech recognition is generally approximately 15 ms to 35 ms, although other intervals are also usable. The MFCCs of an audio signal are indicative of the vocal features of the human speech in the audio signal. Exemplary features of human speech include textual content, age and gender of the user, tone, pitch, cadence, speed, and other aspects that are at least partially indicative of an identity of the speaker.

The ASR module 204 identify an utterance of a key phrase in the received acoustic signal 205 by detecting key phrase data in audio data corresponding to the acoustic signal. In response to detecting an utterance of the key phrase in the acoustic signal 205, the ASR module 204 is configured to cause the system 100 to perform an operation, such as evoke a particular behavior of the system 100 during a conversation or an interaction between a user and the speaker recognition device 102, store the key phrase data in the memory 120, and/or "wake up" the speaker recognition device 102 by transitioning the speaker recognition device 102 from a standby operating state to an active operating state.

The language manager module 206 performs various operations with regard to processing audio data that includes human speech. In this embodiment, the language manager module 206 includes (i) a natural language understanding module configured to recognize a context of human speech in audio data, (ii) a dialogue manager configured to structure audio prompts and user interactions with human speech, (iii) a language generator configured to generate textual content based on a context of human speech in audio data or on an operating state of the system 100, (iv) a text-to-speech synthesizer configured to convert textual content to audio data of synthesized human speech, (v) a knowledge manager to determine correspondences between a context of human speech and user information, and (vi) an application manager configured to schedule modules for execution by the processor 108. In some embodiments, the system 100 does not include a language manager module.

The enrollment module 208 enrolls users with the system 100, the authentication module 210 authenticates a speaker as an enrolled user, and the speech model module 212 forms and trains acoustic speaker models based on audio data including human speech, as discussed in further detail below.

In the processes described below, various acts are described as performed in conjunction with elements and components from FIGS. 1 and 2 for the purpose of illustration.

Figure 3A:
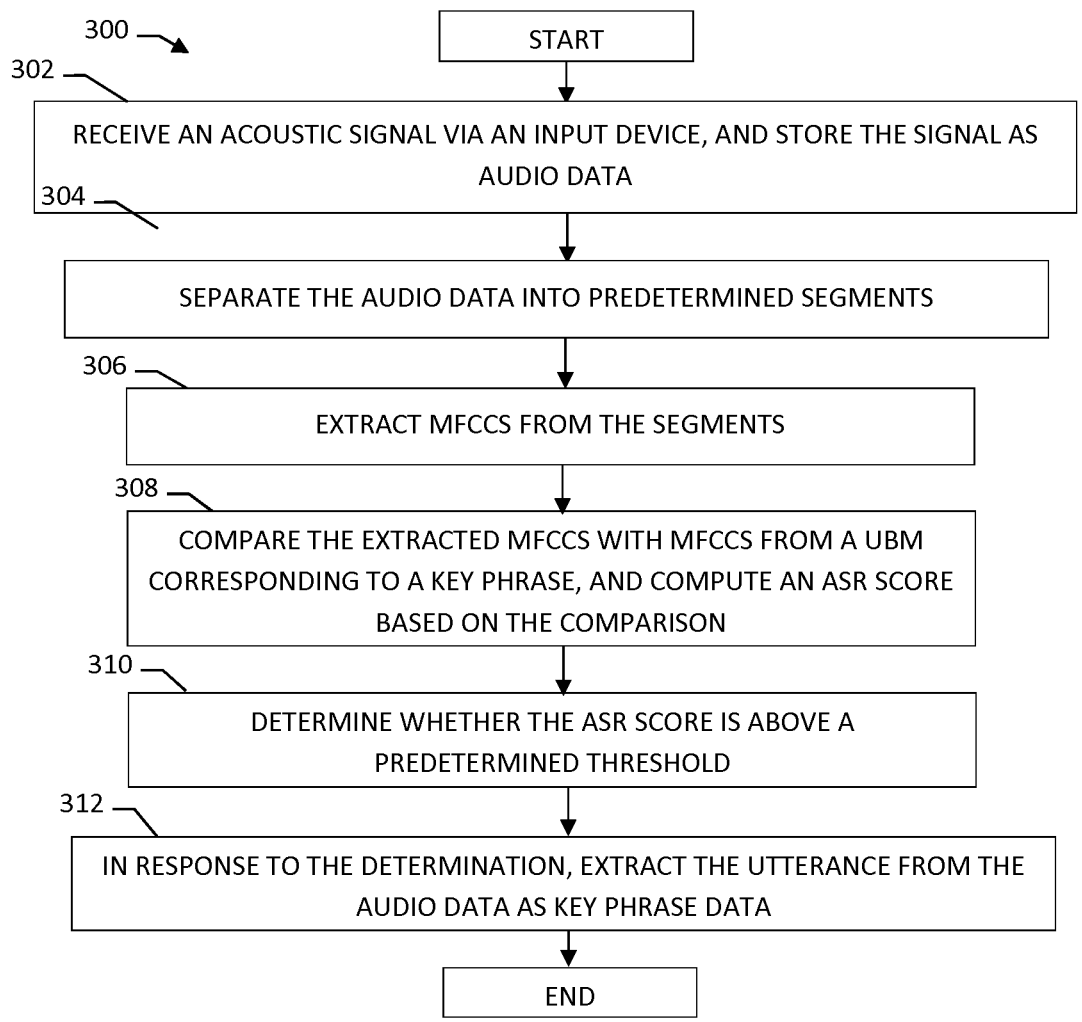
FIG. 3A is a flow diagram depicting an exemplary embodiment of a process for detecting key phrase data within audio data using the system of FIG. 1.
Figure 3B:
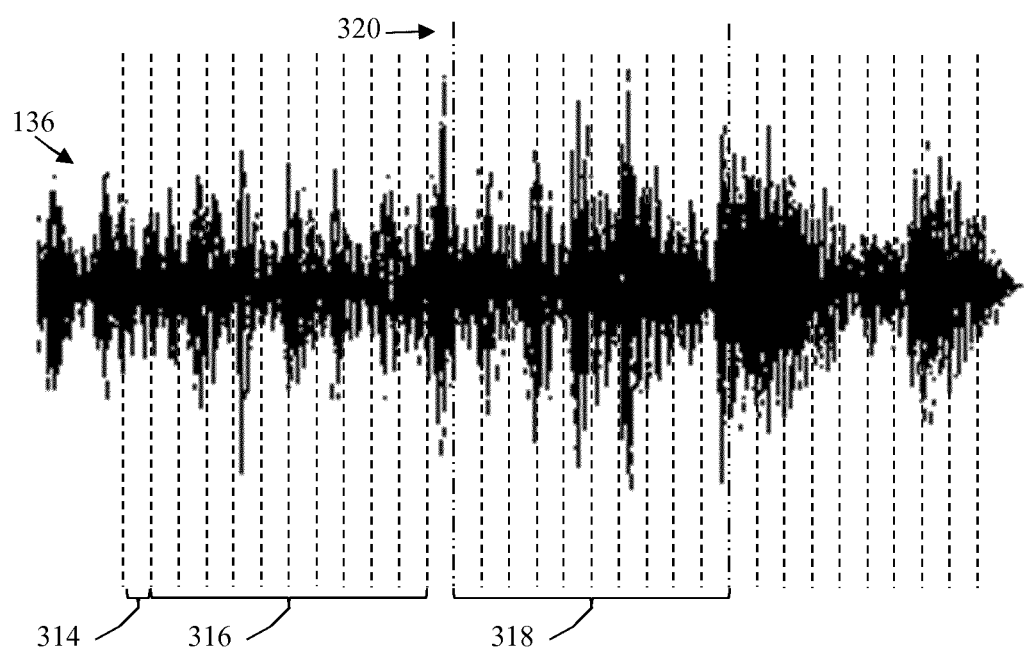
FIG. 3B illustrates audio data processed using the system of FIG. 1.

FIG. 3A is a flow diagram depicting an exemplary embodiment of a process 300 for detecting a predetermined key phrase in the received input acoustic signal 205, and FIG. 3B illustrates audio data 136 that includes key phrase data 320 corresponding to the predetermined key phrase. At block 302 (FIG. 3A), the front-end module 202 receives the acoustic signal 205 using the input device 150. At block 304, the ASR Module 204 separates the audio signal 205 into predetermined segments 314, and stores the segments 314 as audio data 136 (FIG. 3B) in the memory 120. At block 306, the ASR module 204 extracts MFCCS from a portion 316 of the segments 314.

At block 308, the ASR module 204 uses the speech model module 212 to compare the MFCCs extracted from the portion 316 with MFCCs corresponding to the key phrase from a Universal Background Model ("UBM") stored in the memory 120, and compute an ASR confidence score based on the comparison. Any acceptable technique for extracting MFCCs from audio data is usable.

An ASR confidence score is a score indicative of the likelihood that a particular portion of the segments contains the key phrase, and a UBM is an acoustic speaker model that is formed using samples from a plurality of speakers, and thus is usable a general reference point for human speech samples. An acoustic speaker model is a collection of feature vectors that are extracted from multiple speech samples, and which is usable as a reference for human speech when compared with other samples of human speech.

Any acceptable scoring technique is usable to determine the ASR confidence score. In some embodiments, the ASR confidence score is computed by determining ratios between the MFCCs extracted from the particular portion of the segments and the MFCCs of the key phrase from the UBM, and using an average of the ratios as the ASR confidence score. In some embodiments, a Viterbi algorithm is used to calculate the ASR confidence score using the MFCCs of the sample and the key phrase data.

At block 310, the ASR module 204 determines whether the ASR confidence score indicates that the portion 316 contains the key phrase. In some embodiments, the ASR confidence score is compared with a predetermined ASR confidence score threshold. In this example, the ASR module 204 determines that the ASR confidence score does not indicate that the portion 316 includes the key phrase.

In some embodiments, blocks 308 and 310 are repeated for different portions of the segments until either an entirety of the segments for the audio data 136 have been considered, or a portion with an ASR score above the predetermined threshold is detected. In this example, in a repetition of block 308, the ASR module 204 uses the speech model module 212 to compare the MFCCs extracted from a portion 318 of the segments 314 with MFCCs corresponding to the key phrase from the UBM, and compute an ASR confidence score based on the comparison. In a repetition of block 310, the ASR module 204 determines that the ASR score for the portion 316 indicates that the portion 316 includes the key phrase.

At block 312, in response to determining that the ASR score indicates that the portion of the intervals contains the key phrase, the ASR module 204 extracts a portion of the audio data 136 corresponding to the portion of segments as key phrase data 320. In other words, the ASR module 204 extracts the portion 320 of the audio data 136 determined to likely include an utterance of the key phrase. In some embodiments, in response to detecting and extracting the key phrase data 320, the ASR module 204 is configured to one or more of (i) store the key phrase data 320 and/or the corresponding MFCCs in the memory 120, (ii) transmit a signal to another module, such as the application manager of the language manager module 206 in order to indicate that a key phrase has been received, and (iii) cause the speaker recognition device 102 to transition from the standby operating state to the active operating state.

In some embodiments, when storing the intervals in the memory 120 at block 304, the ASR module 204 is configured to stream the storage of the intervals in the memory 120, i.e. limit the total number of intervals buffered in the memory 120, and clear intervals from the memory 120 in a first-in-first-out fashion. For example, in some embodiments, the ASR module 204 is configured to store at most a number of intervals corresponding to 5 seconds of the audio signal 205. In some embodiments, the extent of time used to limit the total number of intervals is set based on a length of the key phrase.

In some embodiments, the speaker recognition device 102 is configured to operate in the standby operating state until transitioned to the active operating state by the ASR module 204, another module, or in response to an instruction. In some embodiments, when operating in the standby operating state, the processor 108 is configured to limit or cease execution of modules other than the front-end module 202 and the ASR module 204 relative to execution by the processor 108 in the active operating state.

When operating in the active operating state, the speaker recognition device 102 is operable in an enrollment mode using the enrollment module 208, and in an authentication mode using the authentication module 210. The enrollment module 208 is configured to enroll a user with the system 100 and form a speaker acoustic model for the user. The authentication module 210 is configured to authenticate whether a speaker is an enrolled user, and grant or deny predefined control and/or access to the system 100 based on the authentication.

In some embodiments, the speaker recognition device 102 operates in the authentication mode by default, and operates in the enrollment mode in response to an instruction from the authentication module 210. For example, in various embodiments, the authentication module 210 is configured to issue an instruction to transition the speaker recognition device 102 to the enrollment mode in response to the ASR module 204 detecting key phrase data, or in response to receiving an instruction via the input device 150 from the user or the remote computing device 104. In one exemplary embodiment, the remote computing device 104 is a portable device such as a mobile telephone is identified in the memory 120 as a trusted device, and is thereby operable to instruct the speaker recognition device 102 to transition to the enrollment mode in order to enroll the user.

Figure 4:
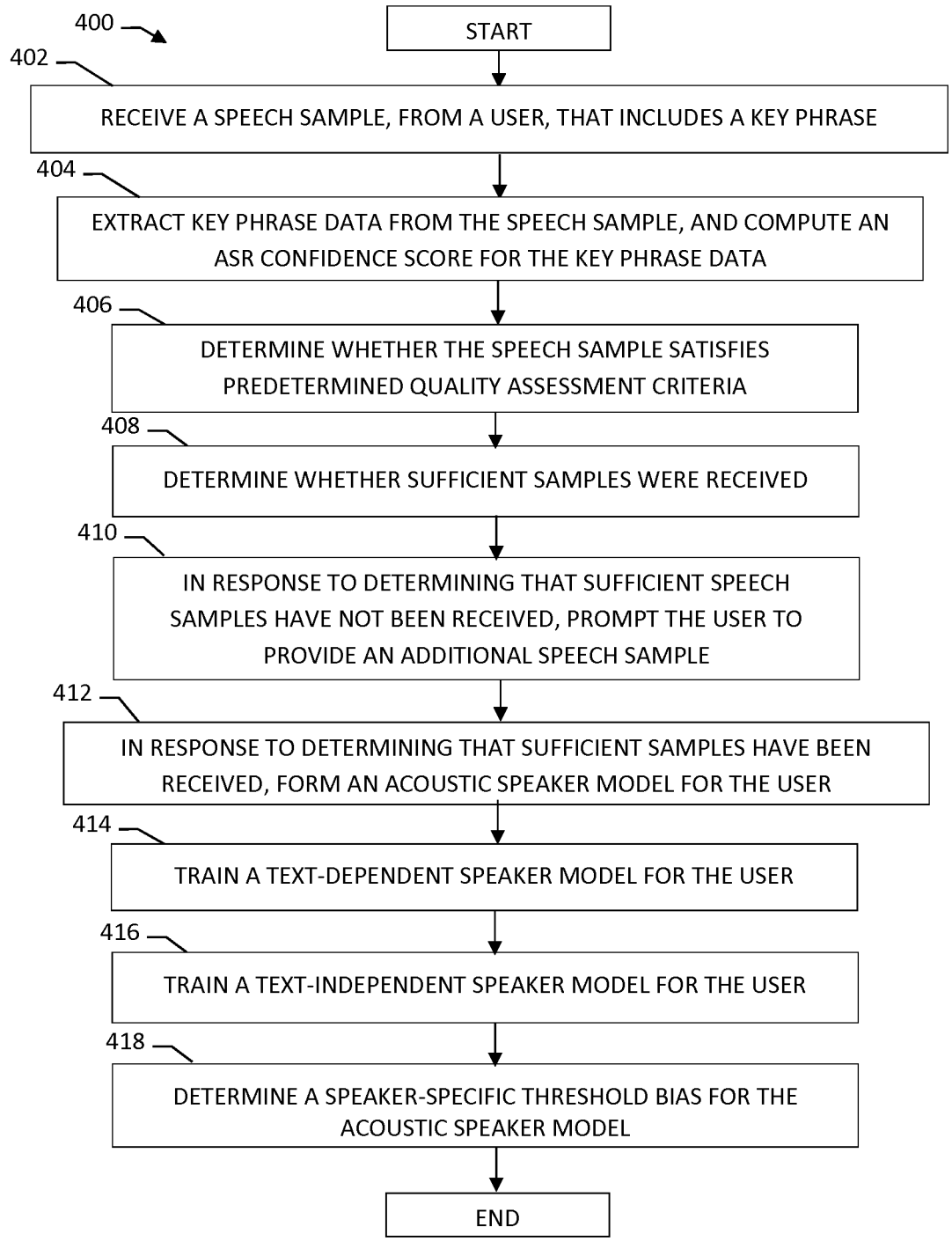
FIG. 4 is a flow diagram depicting an exemplary embodiment of a process for enrolling a user with the system of FIG. 1.

FIG. 4 is a flow diagram depicting an exemplary embodiment of an enrollment process 400 executed by the processor 108 using the enrollment module 208 while operating in the enrollment mode. At block 402, the front-end module 202 receives an acoustic signal 205 that includes a speech sample from a speaker, and stores the acoustic signal 205 as audio data 136 in the memory 120. Enrollment of a speaker as a user is based on speech samples from the speaker that includes an utterance of a key phrase.

At block 404, the ASR module 204 extracts key phrase data from the audio data 136, and compute an ASR confidence score for the key phrase data from the speech sample.

At block 406, the enrollment module 208 determines whether the received speech sample satisfies a set of predetermined quality assessment criteria. In some embodiments, the enrollment module 208 is configured to reject speech samples that do not satisfy the criteria. Since the speech samples received in the enrollment process are used to form the acoustic speaker model for the user, low quality samples could impact the accuracy of the system 100 when attempting to authenticate the user. By rejecting unsatisfactory speech samples, the enrollment module 208 not only increases an accuracy of the system 100, but also decreases a quantity of speech samples needed to accurately enroll a user. The predetermined quality assessment criteria includes a determination that (i) an average speech energy, i.e. average magnitude (dB) of the speech sample is within a predetermined range, i.e. above a predetermined minimum dB value and below a predetermined maximum dB value; (ii) the ASR confidence score of the speech sample is indicative of the presence of the key phrase in the speech sample; and (iii) a signal-to-noise ratio ("SNR") for the speech sample is above a predetermined minimum value. Any acceptable technique for determining an SNR for an audio sample is usable.

At block 408, the enrollment module 208 determines whether sufficient speech samples have been received based on (i) whether a predetermined minimum quantity of speech samples that satisfy the predetermined quality assessment criteria have been received, and (ii) whether a total duration of satisfactory speech samples meets a predetermined period of time. A user's voice may have varying characteristics, based on volume, the speaker's location, the surrounding environment, the context of the speech, the speaker's tone and other factors. The requirement for a predetermined quantity of speech samples enables the system 100 to account for a larger amount of variation in an individual user's voice. The total duration of satisfactory speech samples is related to the total number of MFCCs that can be extracted from the user's speech, and thus requiring a predetermined period of time for the total duration of satisfactory speech samples is beneficial for forming a comprehensive model of the user's speech.

At block 410, in response to a determination in block 408 that sufficient speech samples have not been received, the enrollment module 208 is uses the output device 154 to prompt the user to provide an additional speech sample, and to repeat blocks 402-408 until sufficient speech samples have been received. In some embodiments, the prompt includes textual content with instructions for the user relating to providing an additional speech sample In some embodiments, the textual content of the prompt is generated, such as via the dialogue manager and/or language generator of the language manager module 206, with reference to one or more of the predetermined quality assessment criteria of a previous speech sample. In other words, in some embodiments, the speaker recognition device 102 is configured to identify a potential reason why a preceding speech sample was unsatisfactory with reference to the predetermined quality assessment criteria, and provide an instruction to the user via the output device 154 that, if followed, is likely to improve the quality of a subsequent speech sample. In this manner, the enrollment module 208 is configured to provide on-the-fly feedback to the user during the enrollment process. In other words, the enrollment module 208 is configured to conversationally engage a user via prompts in order to responsively guide the user into providing speech samples optimized for the system 100.

In one example, during the execution of block 406, the enrollment module 208 determines that the average speech energy of the speech sample is below the predetermined maximum dB value, and rejects the speech sample. At block 408, the enrollment module 208 determines that a sufficient number of speech samples have not yet been received. At block 410, the enrollment module 208 generates a prompt for an additional speech sample. Based on the determination during block 406 that the average speech energy was too low, the enrollment module 208 generates textual content for the prompt indicating that the user should increase their speaking volume in a subsequent speech sample.

In some embodiments, the textual content of the prompt is generated, such as via the dialogue manager and/or language generator of the language manager module 206, so as to include instructions for the user to vary the characteristics of subsequent speech samples. Characteristics to be varied include characteristics of the speech such as volume, pitch, tone, as well as other characteristics such as the speaker's position, location, and activity. Providing a wider range of variations in the assembled samples can enable the acoustic speaker model for the user to be more robust to accurately identifying a user under a wider range of circumstances.

At block 412, in response to a determination in block 408 that sufficient speech samples have been received, the enrollment module 208 instructs the speech model module 212 to form an acoustic speaker model for the user and store the acoustic speaker model as model data 140 in the memory 120. Acoustic speaker models are generally formed by applying pattern recognition techniques, such as the use of a Gaussian Mixture Model ("GMM") or Hidden Markov Model ("HMM"), to a user's speech samples, as discussed in further detail below. At block 414, in response to the instruction of the enrollment module 208 in block 412, the speech model module 212 trains a text-dependent speaker model for the user, and stores the text-dependent model as model data 140 in the memory 120.

A text-dependent speaker model is a type of acoustic speaker model that is usable as a reference with samples containing the same textual content as the model. In other words, a text-dependent speaker model is formed from audio data from numerous speech samples uttered by an individual that include a particular key phrase, and is usable to identify whether the speaker is the individual based on an utterance of that particular key phrase by the speaker.

Figure 5A:
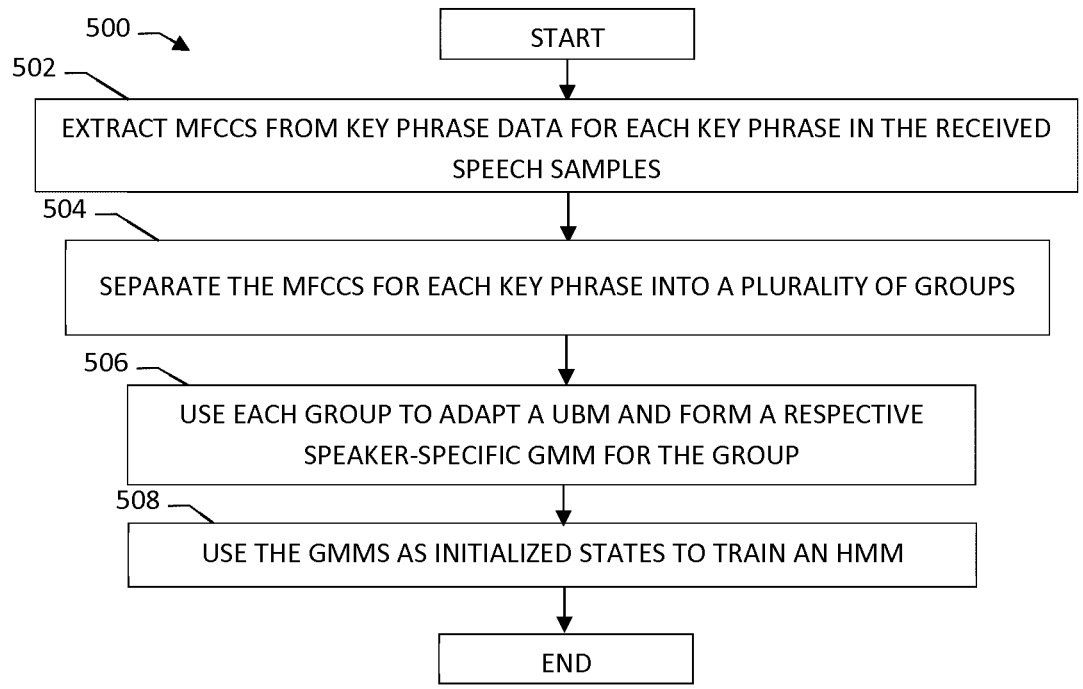
FIG. 5A is a flow diagram depicting an exemplary embodiment of a process for training a text-dependent speaker model with the system of FIG. 1.
Figure 5B:
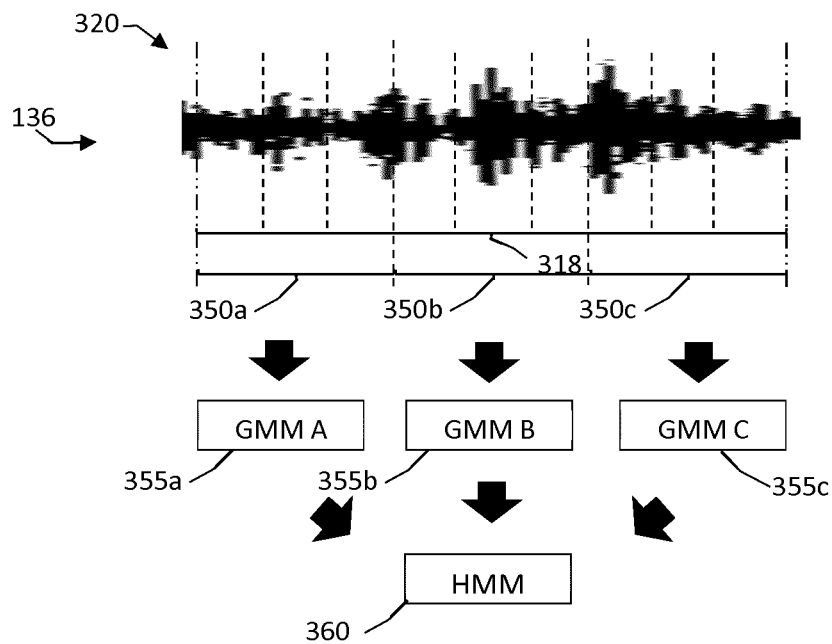
FIG. 5B illustrates key phrase data processed using the system of FIG. 1.

Any acceptable method of training a text-dependent speaker model (block 414) is usable. FIG. 5A is a flow diagram depicting an exemplary embodiment of a process 500 for training a text-dependent speaker model, and FIG. 5B illustrates the use of key phrase data 320 to train a text-dependent speaker model 360 via the process 500. At block 502, the ASR module 204 extracts MFCCs from the key phrase data for each key phrase extracted from speech samples received via the front-end module 202. While the key phrase data 320 in FIG. 5B is the key phrase data for one particular speech sample, it should be understood that the use illustrated in FIG. 5B is similarly applied to the key phrase data of each speech sample during the process 500. The extracted MFCCs, as well as the portion of segments 318 used to extract the MFCCs from each key phrase are stored in the memory 120.

At block 504, the speech model module 212 separates each portion of segments 318 for each key phrase 320 into a plurality of groups 350a-c. In some embodiments, the speech module 212 is configured such that the resulting groups each have a fixed number of MFCCs. In some embodiments, the speech module 212 is configured such that the resulting groups have a number of MFCCS based on a number of words or phonemes in the key phrase. Other divisions for the MFCCS of the key phrase are used in other embodiments.

At block 506, for each group, the speech module 212 uses the MFCCs for the group to adapt a UBM and form a respective speaker-specific GMM 355*a-c* for that group. At block 508, the speech module 212 uses the GMMs 355*a-c* as initialized states to train an HMM as the text-dependent model 360 for the user. Since the initialized states include a respective GMM for each group of each speech sample, rather than only one for each speech sample, a relatively small number of speech samples can result in a sufficiently large number of GMMs. As a result, the speech module 212 is able to train the HMM 360 with a relatively low number of speech samples relative to conventional training techniques.

Returning to FIG. 4, at block 416, in response to the instruction of the enrollment module 208 in block 412, the speech model module 212 trains a text-independent speaker model for the user, and stores the text-independent model as model data 140 in the memory 120. A text-independent speaker model is a type of acoustic speaker model that is usable as a reference with samples containing arbitrary textual content. In other words, a text-independent speaker model is formed from audio data from numerous speech samples uttered by an individual that include arbitrary human speech, and is usable to identify whether the speaker is the individual based on an arbitrary utterance by the speaker.

Figure 6:
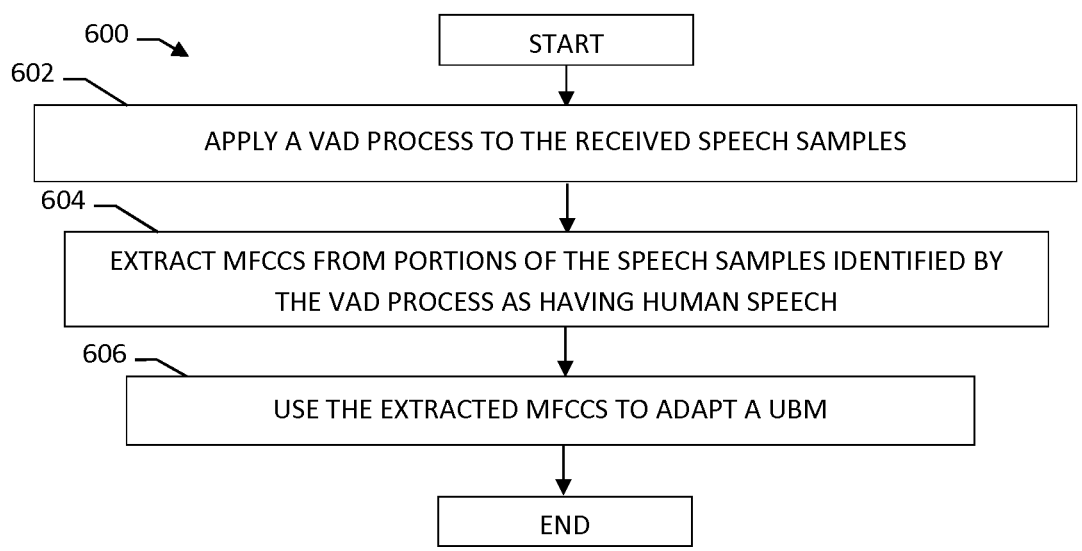
FIG. 6 is a flow diagram depicting an exemplary embodiment of a process for training a text-independent speaker model with the system of FIG. 1.

Any acceptable method of training a text-independent speaker model (block 416) is usable. FIG. 6 is a flow diagram depicting an exemplary embodiment of a process 600 for training a text-independent speaker model. At block 602, the enrollment module 208 applies a Voice Activity Detection ("VAD") process to the received samples. A VAD process detects portions of a speech sample that include human speech, and discard portions that are either non-speech or low-energy speech. At block 604, the ASR module 204 extracts MFCCs from the portions of the speech samples identified as having human speech in block 602. At block 606, the speech module 212 uses the extracted MFCCs to adapt a UBM and form a speaker-specific text-independent model for the user.

Returning to FIG. 4, at block 418, the speech model module 212 determines a speaker-dependent threshold bias for the acoustic speaker model of the user based on the trained text-dependent and text-independent models, and at block 420, the user is enrolled with the system 100.

Figure 7:
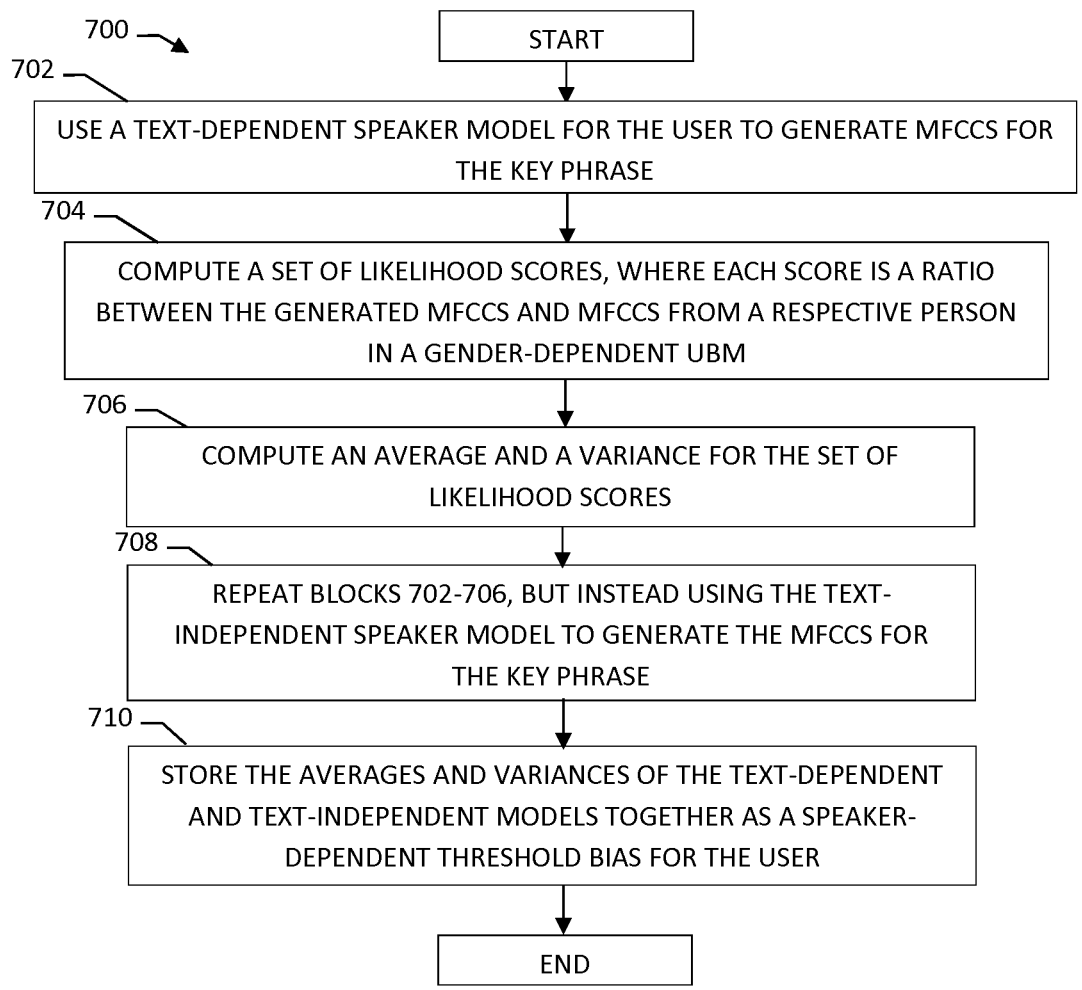
FIG. 7 is a flow diagram depicting an exemplary embodiment of a process for determining a speaker-dependent threshold bias for an acoustic speaker model of a user with the system of FIG. 1.

FIG. 7 is a flow diagram depicting an exemplary embodiment of a process 700 for determining a speaker-dependent threshold bias for an acoustic speaker model of the user based on trained text-dependent and text-independent models. At block 702, the speech module 212 uses the text-dependent model of the user to generate MFCCs for the key phrase data 320. In some embodiments, the speech module 212 additionally uses the language generator and/or the text-to-speech synthesizer of the language manager module 206 and the ASR module 204 to generate these MFCCs. At block 704 the speech module 212 computes a set of likelihood scores, where each score is computed as a ratio between the MFCCs generated using the text-dependent model and MFCCs from a respective person in a gender-dependent UBM.

In some embodiments, the speech module 212 uses system data 134, such as user information and/or historical user data to determine a gender of the user, and selects a UBM formed from samples provided by persons of that gender. In some embodiments, the speech module 212 computes a first set of likelihood scores using a first UBM formed from samples provided by male persons, computes a second set of likelihood scores using a second UBM formed from samples provided by female persons, computes a first average of the first set and a second average of the second set, and selects the set of likelihood scores having the higher average. At block 706, the speech module 212 computes an average and a variance for the set of likelihood scores for the text-dependent model.

At 708, blocks 702-706 are repeated, but for that instead of using the text-dependent model to generate MFCCs for the key phrase 320 in block 702, the text-independent model is used to generate MFCCs for the key phrase 320 in its place so as to compute an average and a variance for the set of likelihood scores for the text-independent model. At 710, the speech module 212 stores the averages and variances of the text-dependent and text-independent models together as a speaker-dependent threshold bias for the user.

Figure 8:
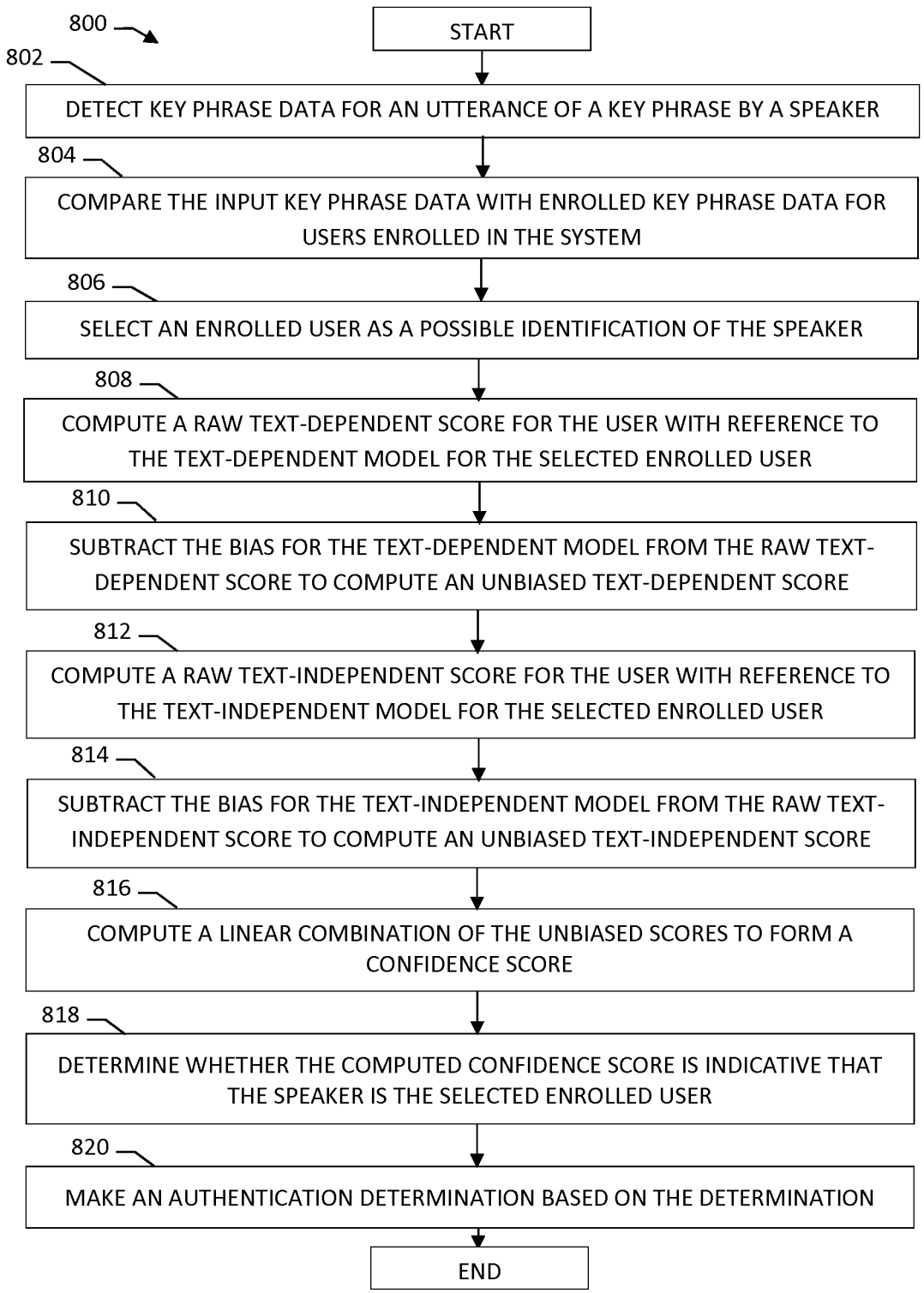
FIG. 8 is a flow diagram depicting an exemplary embodiment of a process for authenticating an unidentified speaker as an enrolled user with the system of FIG. 1.

Once a user has been enrolled in the system 100, such as in the manner discussed above, the system 100 is configured to grant the use predefined control and/or access to the system 100. However, determining that a particular speaker is an enrolled user that merits such control and/or access requires authenticating the speaker as an enrolled user. FIG. 8 is a flow diagram depicting an exemplary embodiment of a process 800 for authenticating a speaker as an enrolled user. At block 802, the authentication module 210 uses the ASR module 204 to detect key phrase 320 within audio data 136, such as via the process 300 discussed above. At block 804, the authentication module 210 compares the key phrase data 320 input from the speaker with enrolled key phrase data for users enrolled with the system 100 by computing a set of likelihood scores, where each score is indicative of an amount of similarity between the input key phrase 320 by the speaker and the enrolled key phrase data by a respective enrolled user. In some embodiments, each score is computed as a ratio between MFCCs from the input key phrase data 320 detected in block 802 and MFCCs for enrolled key phrase data generated from a respective one of the speaker acoustic models for enrolled users. At block 806, the authentication module 210 selects an enrolled user corresponding to the likelihood indicative of a highest amount of similarity between the input key phrase data 320 and the enrolled key phrase data as a possible identification of the speaker.

At block 808, the authentication module 210 computes a raw text-dependent score for the speaker with reference to the text-dependent model for the enrolled user selected as the possible identification of the speaker. Any acceptable scoring method for text-dependent scoring is usable. In some embodiments, the text-dependent model is formed by an HMM, and the authentication module 210 applies a Viterbi algorithm to the HMM and the MFCCs from the key phrase data 320 detected in block 802 to calculate the raw text-dependent score. At block 810, the authentication module 210 subtracts the speaker-specific threshold bias for the text-dependent model of the selected enrolled user from the raw score to compute an un-biased text-dependent score.

At block 812, the authentication module 210 computes a raw text-independent score for the speaker with reference to the text-independent model for the selected enrolled user. Any acceptable scoring method for text-independent scoring is usable. In some embodiments, the text-independent model is formed by a GMM, and the authentication module 210 applies a probability density function to the GMM and the MFCCs from the key phrase data 320 detected in block 802 to calculate the raw text-independent score. At block 814, the authentication module 210 subtracts the speaker-specific threshold bias for the text-independent model of the selected enrolled user from the raw score to compute an un-biased text-independent score.

Since the scores are in an un-biased form, the scores can be evaluated against a common threshold, whereby the text dependent score and the text independent score each represent an independent dimension of a two-dimensional space. At block 816, the authentication module 210 computes a linear combination of the unbiased text-dependent and text-independent scores to form a confidence score for the authentication of the speaker as the selected enrolled user using the formula:

$$\text{Confidence score} = \text{weight1} \times \text{text-dependent score} + \text{weight2} \times \text{text-independent score}$$

where weight1 and weight2 are weights applied to the individual scores. In various embodiments, values for the weights are set based on one or more of the length of the key phrase, the speaker-specific threshold biases, a UBM, and other criteria.

At block 818, the authentication module 210 determines whether the computed confidence score is indicative that the speaker is the selected enrolled user. In some embodiments, this determination includes comparing the computed confidence score with a predetermined confidence threshold. In some embodiments, the predetermined confidence threshold is determined based on system criteria such as trade-offs between a risk of false alarms and a risk of false rejections.

At block 820, the authentication module 210 makes an authentication determination based on the determination with regard to the confidence score, whereby the authentication module 210 authenticates the speaker as the enrolled user when the confidence score indicates that the speaker is the enrolled user and rejects the speaker when the confidence score indicates that the speaker is not the enrolled user. In other words, the determination is based on whether the confidence score indicates that the key phrase data 320 corresponds to speech from the enrolled user. Once a speaker has been authenticated as an enrolled user, the speaker is then granted or denied access and/or control of the system 100 as appropriate.

In some instances, a speaker may utter the key phrase in conjunction with an instruction for the system 100, such as the phrase "Excuse me, play some music," where the phrase "Excuse me" is a key phrase and the phrase "play some music" is an instruction. In some embodiments, the key phrase itself may be include or be indicative of an instruction for the system. In some embodiments, the system 100 is further configured to receive speech samples in addition to the key phrase, and parse the additional speech samples after the speaker has been authenticated by the system 100. In some embodiments, parsing additional speech includes determining a context and/or content of the speech. In some embodiments, parsing the speech includes determining an instruction in the speech and performing an operation in accordance with the instruction.

In some instances, the speaker utters the key phrase when the system 100 is operating in the standby operating state. Since the system 100 is configured to use the key phrase to not only wake up and transition into the active operating state, but also to authenticate the speaker as an enrolled user, the system 100, in some embodiments, is configured to process the utterance of the key phrase and/or additional instructions by the user without the requirement of additional prompting or interaction with the user. In other words, a speaker can utter the key phrase or the key phrase and a command, and perceive the system 100 as responding in a single step, and without the requirement from the speaker for separate steps of wake-up, authentication, and instruction.

In some embodiments, the system 100 is configured to detect a plurality of key phrases, each with its own associated key phrase data, whereby each key phrase corresponds with one or more of different levels of access and/or control of the system 100, different instructions or operations for the system 100, and different enrolled users.

In an exemplary embodiment of using the system 100, the remote computing device 104 is an audio playback device, and a person desires to play music on the device 104. The speaker recognition device 102 is operating in the stand-by mode. In the presence of the speaker recognition device 102, the person says "Play Music." The speaker recognition device 102 captures an audio signal including the utterances of the person, and detects that the audio data includes a predetermined key phrase "Play," and transitions into the active operating state, and more particularly, into the authentication mode. The speaker recognition device 102 then extracts a portion of the audio data corresponding to the detected key phrase, and compares the extracted key phase with utterances of that key phrase by enrolled users. Based on the comparison, the speaker recognition device 102 selects an enrolled user as a possible identification of the person, and computes raw text dependent and text independent scores for the key phrase uttered by the person. The speaker recognition device 102 then subtracts speaker-specific biases from the raw scores, and computes a confidence score for the identification of the person as the selected enrolled user. The speaker recognition device 102 then determines that the confidence score is above a predetermined threshold, and authenticates the person as the selected enrolled user. As a result of the authentication, the speaker recognition device 102 determines that the particular keyword "Play" corresponds to taking an action with regard to the remote computing device 104. Additionally, the speaker recognition device 102 continues to process the audio data, and determine that the action requested by the user corresponds to outputting music on the remote computing device 104. As a result, the speaker recognition device 102 transmits an instruction to the remote computing device 104 causing the remote computing device 104 to play music associated with the enrolled user.

In another exemplary embodiment of using the system 100, the remote computing device 104 is an electronic lock installed on a door, and a person desires to unlock the lock in order to open the door. The speaker recognition device 102 is operating in the stand-by mode. In the presence of the speaker recognition device 102, the person says "Unlock the door." The speaker recognition device 102 captures an audio signal including the utterances of the person, and detects that the audio data includes a predetermined key phrase "Unlock," and transitions into the active operating state, and more particularly, into the authentication mode. The speaker recognition device 102 then extracts a portion of the audio data corresponding to the detected key phrase, and compares the extracted key phase with utterances of that key phrase by enrolled users. Based on the comparison, the speaker recognition device 102 selects an enrolled user as a possible identification of the person, and computes raw text dependent and text independent scores for the key phrase uttered by the person. The speaker recognition device 102 then subtracts speaker-specific biases from the raw scores, and computes a confidence score for the identification of the person as the selected enrolled user. The speaker recognition device 102 then determines that the confidence score is below a predetermined threshold, and rejects the authentication of the person as the selected enrolled user. As a result of the rejection, the speaker recognition device does not continue processing the audio data, and thus does not unlock the lock as requested by the person.

In an additional exemplary embodiment of using the system 100, the remote computing device 104 is an electronic lock installed on a door, and a person desires to unlock the lock in order to open the door. The speaker recognition device 102 is operating in the stand-by mode. In the presence of the speaker recognition device 102, the person says "Did you remember to unlock the door?" The speaker recognition device 102 then proceeds to authenticate the person as an enrolled user based on the person's utterance of the key phrase "unlock," and proceeds to process the remainder of the person's utterance. The speaker recognition device 102 determines a context of the utterance as not being an instruction for the system 100, and does not unlock the lock.

In a further exemplary embodiment of using the system 100, the speaker recognition device 102 is operating in the stand-by mode. In the presence of the speaker recognition device 102, a first person says "Excuse me, add a new user." The speaker recognition device 102 captures an audio signal including the utterances of the first person, and detects that the audio data includes a predetermined key phrase "Excuse me," and transitions into the active operating state, and more particularly, into the authentication mode. The speaker recognition device 102 then proceeds to authenticate the first person as a first user enrolled with the system 100, and then processes the remainder of the audio data, including the phrase "add a new user" to determine that a new user is desirably added. As a result, the speaker recognition device 102 prompts a second person to speak their name as well as the key phrase "Excuse me." The speaker recognition device 102 then determines whether the second person's utterance is loud enough, and whether the second person's utterance is likely to contain the required key phrase. The speaker recognition device 102 then prompts the second person to "Repeat that please, and this time a bit louder." The speaker recognition device 102 then determines that the second person's utterance satisfies relevant criteria, and uses the second person's utterances to form text-dependent and text-independent models for the second person. The speaker recognition device 102 then uses the models and a UBM to compute speaker-specific threshold biases for the second person, and enrolls the second person with the system 100.

In an additional exemplary embodiment of using the system 100, the speaker recognition device 102 is operating in the stand-by mode. A person is using a remote computing device 104 that is authenticated by the system 100. With the device 104, the person instructs the system 100 that the person desires to enroll their voice with the system 100. The remote device 104 transmits an instruction that causes the speaker recognition device 102 to transition into the active operating state, and in particular to the enrollment mode. The speaker recognition device then proceeds to enroll the person with the system 100.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

It is claimed:

1. A method of authenticating a speaker as an enrolled user, comprising:
   detecting, with a processor, input key phrase data corresponding to a key phrase uttered by a speaker;
   computing, with the processor, a text-dependent score with reference to the input key phrase data and a text-dependent acoustic speaker model of speech from the enrolled user stored in a memory operatively connected to the processor;
   computing, with the processor, a text-independent score with reference to the input key phrase data and to a text-independent acoustic speaker model of the speech from the enrolled user stored in the memory;
   computing, with the processor, a confidence score for authenticating the speaker as the enrolled user with reference to the text-dependent score and the text-independent score;
   authenticating the speaker as the enrolled user when the confidence score indicates that the input key phrase data corresponds to the speech from the enrolled user; and
   rejecting authentication of the speaker as the enrolled user when the confidence score indicates that the input key phrase data does not correspond to the speech from the enrolled user,
   wherein detecting the input key phrase data includes:
      separating a portion of input audio data into predetermined segments;
      extracting, with the processor, mel-frequency cepstral coefficients ("MFCC"s) indicative of human speech features present within each segment;
      comparing the extracted MFCCs with MFCCs corresponding to the key phrase from a Universal Background Model ("UBM") stored in the memory; and
      determining that the portion of the input audio data includes the utterance of the key phrase based on the comparison, and
   wherein computing the text-dependent score includes:
      generating MFCCs corresponding to the key phrase using the text-dependent model;
      computing a raw text-dependent score based on the extracted MFCCs and the MFCCS generated with the text-dependent model; and
      subtracting a speaker-specific threshold bias for the text-dependent model from the raw text-dependent score, wherein the speaker-specific threshold bias for the text-dependent model is based on a comparison of the MFCCS generated with the text-dependent model and MFCCs corresponding to the key phrase from a UBM matched to a gender of the enrolled user.

2. The method of claim 1, wherein the text-dependent model is a Hidden Markov Model ("HMM") formed using groups of mel-frequency cepstral coefficients ("MFCC"s) extracted from enrolled key phrase data corresponding to utterances of the key phrase by the enrolled user, each group corresponding to a partial portion of the key phrase as spoken by the enrolled user.

3. The method of claim 2, wherein:
   detecting the input key phrase data includes:
      separating a portion of input audio data into predetermined segments;

extracting, with the processor, MFCCs indicative of human speech features present within each segment; and computing the text-dependent score includes:
  generating MFCCs corresponding to the key phrase using the HMM; and
  applying a Viterbi algorithm to the MFCCs extracted from the portion of the input audio data and the MFCCs generated with the HMM.

4. The method of claim 1, wherein computing the text-independent score includes:
  generating MFCCs corresponding to the key phrase using the text-independent model;
  computing a raw text-independent score based on the extracted MFCCs and the MFCCs generated with the text-independent model; and
  subtracting a speaker-specific threshold bias for the text-independent model from the raw text-independent score, wherein the speaker-specific threshold bias for the text-independent model is based on a comparison the MFCCS generated with the text-independent model and MFCCs corresponding to the key phrase from a UBM matched to a gender of the enrolled user.

5. The method of claim 1, further comprising:
applying, with the processor, far-field enhancement to the input audio data.

6. The method of claim 1, further comprising:
  comparing, with the processer, the detected input key phrase data with enrolled key phrase data corresponding to a plurality of enrolled users stored in the memory;
  computing a likelihood score for each enrolled user, each likelihood score indicative of an amount of similarity between the detected input key phrase data and the corresponding enrolled key phrase data for each enrolled user; and
  selecting the enrolled user having enrolled key phrase data with a highest amount of similarity with the detected input key phrase data as a possible identification of the speaker.

7. The method of claim 1, wherein the confidence score is computed as a linear combination of the text-dependent score and the text-independent score.

8. The method of claim 1, further comprising:
enrolling a user by:
  extracting, with the processor, further input key phrase data from further audio data corresponding to a speech sample provided by the user, the further input key phrase data corresponding to the key phrase uttered by the user in the speech sample;
  determining, with the processor, whether the extracted further input key phrase data satisfies a set of predetermined quality assessment criteria;
  determining, with the processor, whether a sufficient number of speech samples for the user have been received based on whether a predetermined minimum quantity of further input key phrase data satisfying the predetermined quality assessment criteria have been received, and whether a total duration of speech in the key phrase data satisfying the predetermined quality assessment criteria is at or above a predetermined period of time;
  in response to determining that a sufficient number of speech samples has not been received, generating, with the processor, a prompt for the user to provide an additional speech sample, and outputting the prompt via an output device operatively connected to the processor; and
  in response to determining that a sufficient number of speech samples has been received, forming, with the processor, an acoustic speaker model for the user that includes a text-dependent acoustic speaker model and a text-independent acoustic speaker model so as to enroll the user.

9. The method of claim 8, wherein generating the prompt includes:
  identifying one or more of the predetermined quality assessment criteria that were not satisfied by further input key phrase data extracted from a preceding speech sample;
  determine a modification to the preceding speech sample that would overcome the unmet one or more of the predetermined quality assessment criteria; and
  include an instruction indicative of the determined modification in the prompt.

10. The method of claim 8, wherein forming an acoustic speaker model for the user includes:
  training the text-dependent model by:
    extracting mel-frequency cepstral coefficients ("MFCC"s) from the further input key phrase data for each speech sample satisfying the set of predetermined quality assessment criteria;
    separating the MFCCs from each speech sample into groups, each group corresponding to a partial portion of the key phrase;
    for each group of the MFCCs for each speech sample, using the group to adapt a Universal Background Model ("UBM") and form a respective Gaussian Mixture Model ("GMM");
    training a Hidden Markov Model, with the GMMs for the groups as initialized states, to form the text-dependent model; and
  training the text-independent model by:
    identifying, with the processor, portions of the further audio data corresponding to portions of the speech samples provided by the user that include human speech;
  extracting, with the processor, MFCCs from the identified portions of the further audio data; and
  using the MFCCs extracted from the identified portions of the further audio data to adapt a UBM and form the text-independent model.

11. A speaker recognition system, comprising:
a memory configured to store:
  enrolled key phrase data corresponding to utterances of a key phrase by enrolled users;
  text-dependent acoustic speaker models of the enrolled users; and
  text-independent acoustic speaker models of the enrolled users;
a processor operatively connected to the memory, and configured to execute programming instructions to authenticate a speaker as an enrolled user, wherein authenticating the speaker as the enrolled user includes:
  detecting input key phrase data corresponding to a key phrase uttered by a speaker;
  computing a text-dependent score with reference to the input key phrase data and a text-dependent acoustic speaker model of speech from the enrolled user;

computing a text-independent score with reference to the input key phrase data and to a text-independent acoustic speaker model of the speech from the enrolled user;

computing a confidence score for authenticating the speaker as the enrolled user with reference to the text-dependent score and the text-independent score;

authenticating the speaker as the enrolled user when the confidence score indicates that the input key phrase data corresponds to the speech from the enrolled user; and rejecting authentication of the speaker as the enrolled user when the confidence score indicates that the input key phrase data does not correspond to the speech from the enrolled user, wherein detecting the input key phrase data includes:

separating a portion of input audio data into predetermined segments;

extracting, with the processor, mel-frequency cepstral coefficients ("MFCC"s) indicative of human speech features present within each segment;

comparing the extracted MFCCs with MFCCs corresponding to the key phrase from a Universal Background Model ("UBM") stored in the memory; and determining that the portion of the input audio data includes the utterance of the key phrase based on the comparison, and wherein computing the text-dependent score includes:

generating MFCCs corresponding to the key phrase using the text-dependent model;

computing a raw text-dependent score based on the extracted MFCCs and the MFCCS generated with the text-dependent model; and subtracting a speaker-specific threshold bias for the text-dependent model from the raw text-dependent score, wherein the speaker-specific threshold bias for the text-dependent model is based on a comparison of the MFCCS generated with the text-dependent model and MFCCs corresponding to the key phrase from a UBM matched to a gender of the enrolled user.

12. The speaker recognition device of claim 11, wherein:

the processor is further configured to execute programming instructions to enroll a user; and enrolling the user includes:

extracting further input key phrase data from to a speech sample provided by the user, the further input key phrase data corresponding to the key phrase uttered by the user in the speech sample;

determining whether the extracted further input key phrase data satisfies a set of predetermined quality assessment criteria;

determining whether a sufficient number of speech samples for the user have been received based on whether a predetermined minimum quantity of further input key phrase data satisfying the predetermined quality assessment criteria have been received, and whether a total duration of speech in the key phrase data satisfying the predetermined quality assessment criteria is at or above a predetermined period of time;

in response to determining that a sufficient number of speech samples has not been received, generating a prompt for the user to provide an additional speech sample, and outputting the prompt via an output device operatively connected to the processor; and in response to determining that a sufficient number of speech samples has been received, forming an acoustic speaker model for the user that includes a text-dependent acoustic speaker model and a text-independent acoustic speaker model so as to enroll the user.

13. The speaker recognition device of claim 11, wherein the processor is further configured to apply far-field enhancement to the input key phrase data.

\* \* \* \* \*

UNITED STATES PATENT AND TRADEMARK OFFICE
CERTIFICATE OF CORRECTION

PATENT NO. : 11,295,748 B2
APPLICATION NO. : 16/629945
DATED : April 5, 2022
INVENTOR(S) : Shen et al.

Page 1 of 1

It is certified that error appears in the above-identified patent and that said Letters Patent is hereby corrected as shown below:

In the Claims

In Claim 12, at Column 24, Lines 8-9: "from to a speech sample" should read --from a speech sample--.

Signed and Sealed this
Sixth Day of September, 2022

Katherine Kelly Vidal
*Director of the United States Patent and Trademark Office*